Aug. 26, 1969  B. BOUCHET ET AL  3,463,923
MAGAZINE FOR THE TEMPORARY STORAGE OF NUCLEAR FUEL RODS
Filed Aug. 10, 1966

INVENTORS
BARNARD BOUCHET
ROBERT CHARLES

BY
Stevens, Davis, Miller & Mosher
ATTORNEYS

United States Patent Office 3,463,923
Patented Aug. 26, 1969

3,463,923
MAGAZINE FOR THE TEMPORARY STORAGE OF NUCLEAR FUEL RODS
Bernard Bouchet, Villetaneuse, Seine-Saint-Denis, France, and Robert Charles, Chatelet, Hainaut, Belgium, assignors to European Atomic Energy Community (Euratom), Brussels, Belgium
Filed Aug. 10, 1966, Ser. No. 578,954
Claims priority, application France, Aug. 10, 1965, 27,900
(Filed under Rule 47(a) and 35 U.S.C. 116)
Int. Cl. G21h 5/00
U.S. Cl. 250—106    4 Claims

ABSTRACT OF THE DISCLOSURE

A movable magazine for the temporary storage of nuclear fuel rods during reactor loading and discharging operations comprising a tank filled with a reactor coolant fluid. The tank has two aligned passageways through opposed walls of the tank. Several storage supports are mounted on movable arms around each passageway, which arms enable movement of the supports from their respective storage locations to a position of alignment with the passageways.

---

Figure 1:
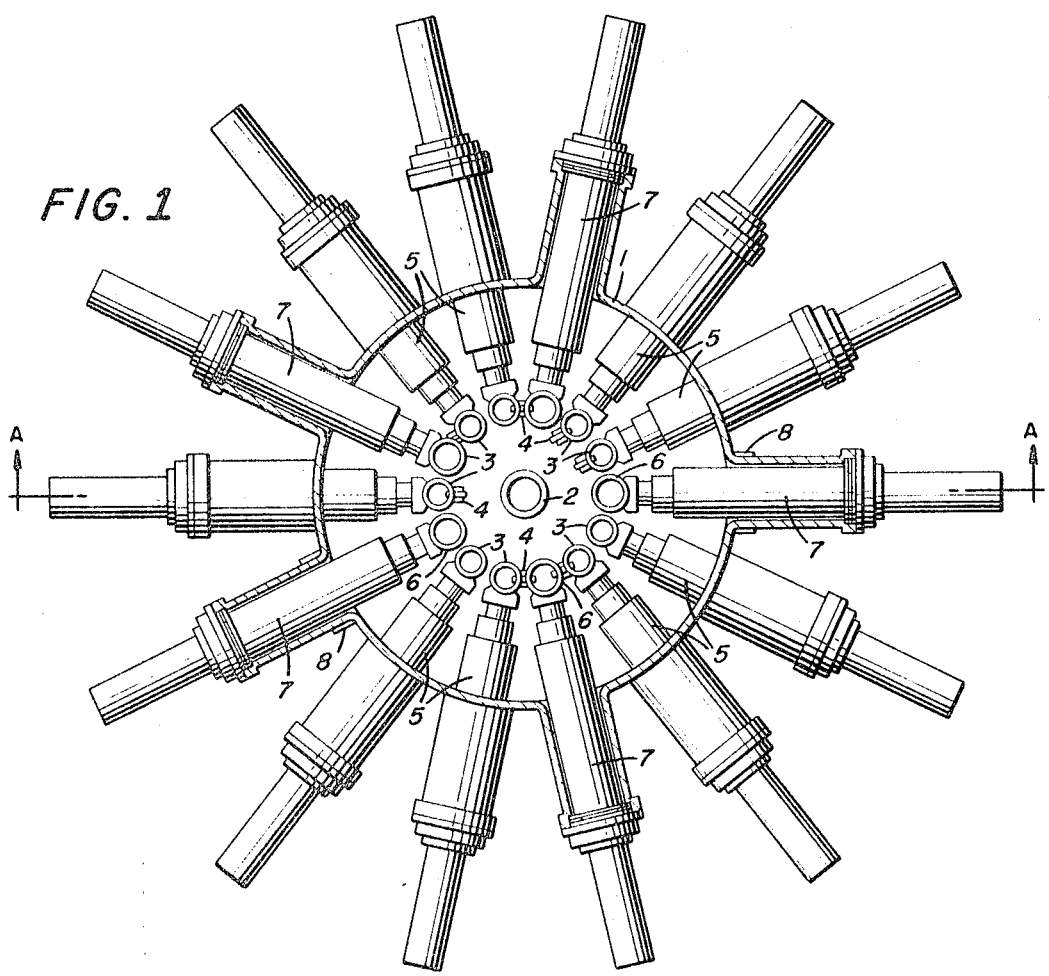

This invention relates to a magazine for the storage of fuel rods for a nuclear reactor and of the kind comprising a tank (e.g., substantially in the form of a drum) filled, or to be filled, with a coolant fluid.

Such tanks are used for the temporary storage of new or used fuel elements and contaminated reactor parts, for example channel covers, and may be used for conveyance of rods, between the reactor and a hot cell.

The tanks have aligned passagways for the insertion of a remote-controlled manipulator and the entry and exit of the articles to be stored.

In a known embodiment of such a magazine (French Patent No. 1,305,507 dated Aug. 16, 1961), there are two passageways parallel with, but spaced from, the axis of the tank or drum and aligned with one another, the distance which separates the passageways from the axis of the drum being equal to the distance separating storage positions for rods from the axis of the drum. By rotating the positions, or the drum, about the drum axis, all the storage positions can thus be brought into alignment with the two passageways. The magazine runs on rails, so that the passageways can be brought into alignment with each of the channels of the reactor. The passageway adjacent the reactor is connected tightly sealed to the channel with which it is aligned, so that the cover of the channel must be removed beforehand.

While the storage tank is being loaded and unloaded, it is filled with the reactor coolant. Because of the high radiation level, the driving motor used for rotating the magazine must be disposed outside the shielding of the tank, i.e., a driveshaft must pass through the wall of the tank as tightly sealed as possible.

This requirement is difficult to fulfill when water is used as a coolant, but it becomes impossible, in practice, to satisfy when an organic coolant fluid which freezes at ambient temperature is used. This type of organic coolant fluid would very soon enter the passage of the shaft, where it would freeze and stop the shaft.

Furthermore, the extremely poor lubircant properties of some coolant fluids cause considerable difficulties with the mounting of the shaft of the magazine. These fluids shorten the life of the bearings considerably and therefore often put the whole apparatus out of action; furthermore, they may make it necessary to use a replacement apparatus as an alternative.

This invention relates to a magazine with no shaft passage or bearing in the region in which coolant fluid is present. Any part subjected to friction during operation is therefore avoided in this region.

The invention provides a magazine for the storage of fuel rods for a nuclear reactor, comprising a tank filled, or to be filled, with coolant fluid, two aligned passageways through opposed walls of the tank, one passageway being for connection in alignment with a reactor channel to be loaded or unloaded, and the other passageway being for a manipulator arm, a plurality of movable fuel rod supports are mounted at storage locations within the tank around the passageways and for each support there is provided at least one sliding or telescopic arm which can be actuated from outside the tank to move the support from its storage location to a position of alignment with the passageways.

A preferred feature is that the arrangement may enable the manipulator arm to pass through both passageways into the reactor channel.

In one form of the magazine the tank is cylindrical, the passageways are on the axis of the cylinder and the arms are radial.

A preferred embodiment of the invention has supports for channel covers, etc., likewise supported by radial telescopic arms, provided for example, on a circle having the same radius as that of the fuel rod supports. The ends of the fuel rod supports facing towards the reactor may have holding means which prevent any undesirable displacement of the stored rods in the direction of the reactor, there being at least one further sliding or telescopic arm operable from outside the tank and provided for releasing the holding means when a support is in alignment with the passageways.

Figure 2:
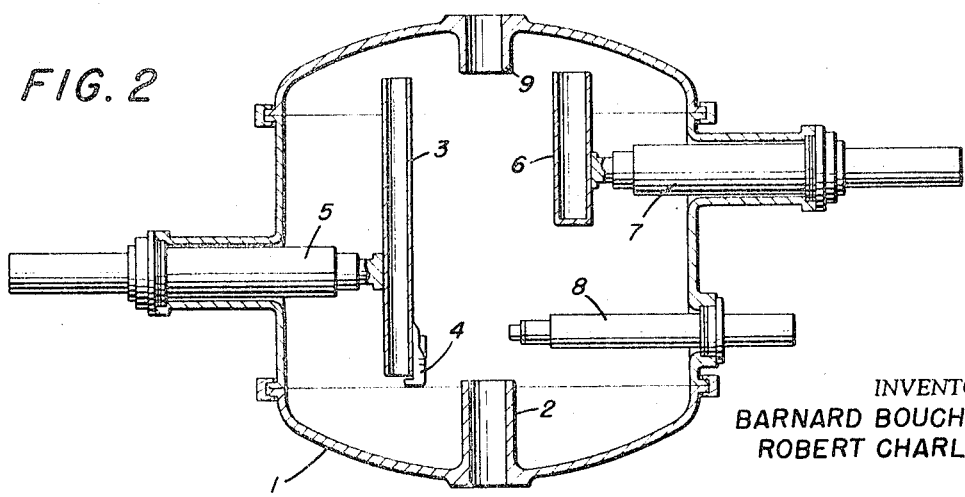

Other features and advantages of the invention will be made clear by the following detailed description of a specific example of a magazine which is shown in the accompanying drawings in which:

FIGURE 1 is a horizontal cross-section of the magazine, taken through the arms 7, and FIGURE 2 is an immediate vertical seciton of the magazine along the line A—A in FIGURE 1.

The drawing show the cylindrical casing 1 of a tank filled with coolant fluid. In the-middle of the casing there is a central tube 2 with a passageway through which the fuel rods or elements are conveyed into a reactor channel. The tube is, in use, connected tightly sealed to the channel of the reactor by means of conventional closing elements and connections (not shown).

The supports for the fuel elements comprise several tubes 3, which are open at their two ends the lower end (i.e., the end nearer to the reactor) of each tube having a holding element 4 for preventing the fuel elements introduced into the tube from falling by gravity.

Each of the tubes is supported by a sliding or telescopic arm 5 and the tubes are normally kept on a circle concentric with the axis of the drum and with the tube 2. The telescopic arms 5 are secured in tubes fixed to the wall of the container and their parts subject to friction are protected by metal expansion type joints against penetration by coolant fluid. To simplify the drawing, these joints are not shown. The telescopic arms are actuated either manually or by remote control, by their ends situated outside the tank. Each telescopic arm has an exactly determined travel, so that the axis of symmetry of the fuel element supported by the arm arrives exactly above the tube 2 when the arm is actuated correspondingly.

In addition to the supports of the fuel elements, other supports 6 for the reactor-channel covers are also disposed on a circle, with the same radius, and the latter supports can also be brought into line with the tube 2.

These supports are also secured to telescopic arms 7 which can be actuated from outside. These arms are made and secured in the wall of the tank in the same way as the former ones, but their support tubes 6 are closed at their bottom ends and are shorter so as to correspond with the articles to be stored in their cavities.

The holding elements 4 of the fuel elements can be actuated by two other sliding or telescopic arms 8, which, in FIGURE 1, are situated below two of the telescopic arms 7 intended for auxiliary article supports.

FIGURE 2 shows more clearly one of the telescopic arms 8 for releasing the holding element 4. When this arm is actuated, its end reaches a position near the axis of the tank and can therefore only unlock the locking element of a support 3 which has been brought by its telescopic arm into line with the bottom passage 2. For reasons of design, two complementary telescopic arms 8 have been provided, which are disposed approximately diametrically opposite one another and enable the locking elements to be arranged better around a circle. To complete the description, mention is made of a top passageway 9, through which a manipulator arm (not shown) can enter. The arm of the manipulator is formed so that it can seize the fuel element, but it is no wider than the latter and can thus transfer the fuel element through a support tube 3 into a reactor channel.

It follows from the above that no element subject to friction during operation can come into contact with the coolant fluid. As the magazine does not rotate, practically all bearings and shaft passages are eliminated, so that this device has a long life and operates very reliably, even when coolants with very poor lubricant properties are used.

The device described and illustrated by way of non-restrictive example may, of course, be modified in many ways, and, in particular, the invention is not limited to the number and design of the supports, nor to the vertical arrangement of the fuel elements.

We claim:

1. A movable magazine for the temporary storage of nuclear fuel rods during reactor loading and discharging operations comprising a tank substantially filled with coolant, two aligned passageways through opposed walls of said tank, one of said passageways being for connection in alignment with a reactor channel to be loaded and discharged and the other passageway being for a manipulator arm, a plurality of movable arms passing through the walls of said tank in sealing relationship, a plurality of fuel rod supports mounted on said movable arms, said arms being actuated from outside the tank to selectively move said fuel rod supports from a storage position within said tank and around said passageways to a position of alignment with said passageways.

2. A movable magazine as claimed in claim 1 in which said tank is cylindrical, said passageways being located on the axis of the cylinder and said arms extend radially of said tank.

3. A movable magazine as claimed in claim 1 further comprising additional movable arms passing through the walls of said tank in sealing relationship, additional support members mounted on said additional arms for supporting channel covers and other parts and selectively moving them into and out of alignment with the passageways.

4. A movable magazine as claimed in claim 1 further comprising releasable holding means on said fuel rod supports for holding fuel rods therein, means operable from outside said tank to release said holding means when a support is in alignment with said passageways.

References Cited

UNITED STATES PATENTS 3,190,806 6/1965 Mangieri et al.
3,271,263 9/1966 Frame et al. _____ 176—30

RAPLH G. NILSON, Primary Examiner

MORTON J. FROME, Assistant Examiner

U.S. Cl. X.R.

176—30; 214—18; 250—108